United States Patent [19]
Razdan et al.

[11] Patent Number: 6,141,734
[45] Date of Patent: Oct. 31, 2000

[54] METHOD AND APPARATUS FOR OPTIMIZING THE PERFORMANCE OF LDXL AND STXC INTERLOCK INSTRUCTIONS IN THE CONTEXT OF A WRITE INVALIDATE PROTOCOL

[75] Inventors: Rahul Razdan, Princeton; David Arthur James Webb, Jr., Groton; James Keller, Waltham, all of Mass.; Derrick R. Meyer, Austin, Tex.; Daniel Lawrence Leibholz, Cambridge, Mass.

[73] Assignee: Compaq Computer Corporation, Houston, Tex.

[21] Appl. No.: 09/017,752

[22] Filed: Feb. 3, 1998

[51] Int. Cl.$^7$ ................................................. G06F 13/00
[52] U.S. Cl. ......................... 711/144; 711/145; 711/156; 711/163
[58] Field of Search ........................... 711/128, 144, 711/163, 145, 118, 147, 156; 710/200; 712/223; 709/248

[56] References Cited

U.S. PATENT DOCUMENTS

| | | | |
|---|---|---|---|
| 4,224,664 | 9/1980 | Trinchieri | 364/200 |
| 4,513,367 | 4/1985 | Chan et al. | 364/200 |
| 4,928,225 | 5/1990 | McCarthy et al. | 364/200 |
| 4,977,498 | 12/1999 | Rastegar et al. | 711/128 |
| 5,193,167 | 3/1993 | Sites et al. | 711/163 |
| 5,226,143 | 7/1993 | Baird et al. | 711/145 |
| 5,237,694 | 8/1993 | Horne et al. | 710/200 |
| 5,442,755 | 8/1995 | Shibata | 395/325 |
| 5,568,624 | 10/1996 | Sites et al. | 712/223 |
| 5,623,671 | 4/1997 | Ando et al. | 395/726 |
| 5,655,100 | 8/1997 | Ebrahim et al. | 395/471 |
| 5,669,002 | 9/1997 | Buch | 395/726 |
| 5,678,026 | 10/1997 | Vartti et al. | 711/152 |
| 5,680,576 | 10/1997 | Laudon | 395/472 |
| 5,778,423 | 7/1998 | Sites et al. | 711/118 |
| 5,895,482 | 4/1999 | Greenspan et al. | 711/147 |
| 5,928,334 | 7/1999 | Mandyam et al. | 709/248 |

OTHER PUBLICATIONS

Gieseke, B.A., et al., "A 600MHz Superscalar RISC Microprocessor With Out–of–Order Execution."

Gieseke, B.A., et al., "A 600MHz Superscalar RISC Microprocessor With Out–of–Order Execution," IEEE International Soild–State Circuits Conference , (1997).

Gwennap, L., "Digital 21264 Sets New Standard—Clock Speed, Complexity, Performance Surpass Records, But Still a Year Away," *Microprocessor Report*, 10(14):1–11, (Oct. 1996).

Keller, J. et al., "A Superscalar Alpha Processor wth Out–of–Order Execution," *Microprocessor Forum*, (Oct. 1996).

*Primary Examiner*—John W. Cabeca
*Assistant Examiner*—Fred F. Tzeng
*Attorney, Agent, or Firm*—Hamilton, Brook, Smith & Reynolds, P.C.

[57] ABSTRACT

A technique for implementing load-locked and store-conditional instruction primitives by using a local cache for information about exclusive ownership. The valid bit in particular provides information to properly execute load-locked and store-conditional instructions without the need for lock flag or local lock address registers for each individual locked address. Integrity of locked data is accomplished by insuring that load-locked and store-conditional instructions are processed in order, that no internal agents can evict blocks from a local cache as a side effect as their processing, that external agents update the context of cache memories first using invalidating probe commands, and that only non-speculative instructions are permitted to generate external commands.

15 Claims, 7 Drawing Sheets

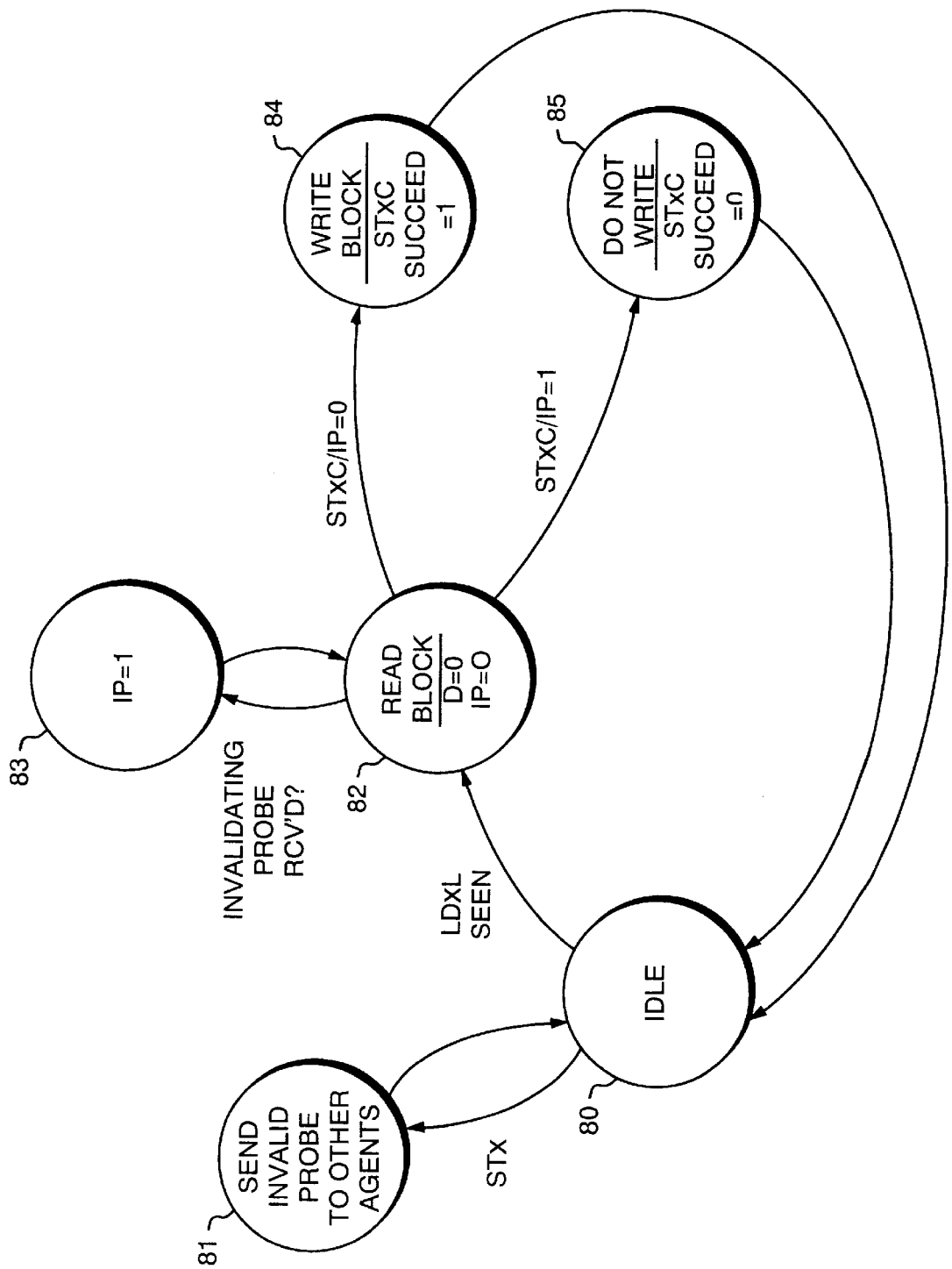

METHOD AND APPARATUS FOR OPTIMIZING THE PERFORMANCE OF LDXL AND STXC INTERLOCK INSTRUCTIONS IN THE CONTEXT OF A WRITE INVALIDATE PROTOCOL

FIELD OF THE INVENTION

This invention relates generally to techniques for permitting multiple data processors to share the use of a common resource such as memory and in particular to a technique for implementing memory interlocking instructions.

BACKGROUND OF THE INVENTION

In data processing systems that make use of multiple processors it is often desirable to permit more than one processor to share access to a resource such as a memory location. The shared memory locations can then be used as a mechanism for communicating information between the processors, for example.

It is usually desirable to share access in such a way as to avoid corrupting the contents of the memory location when both processors attempt to write to it at the same time. Therefore, most multiprocessor system include some type of mechanism to avoid these write conflicts.

One technique to avoid interference among processors is to control the exact order in which each processor may issue instructions that access the shared location. However, present high speed processors typically use instruction scheduling techniques which may reorder, on-the-fly, an originally programmed instruction sequence. By allowing instruction reordering, a processor can use of sophisticated multibank cache memories, bypassed write buffers, write merging, and pipeline processing techniques. In such a system, a sequence of reads or writes issued by one agent, as viewed by another agent, may be arbitrarily reordered in a way which cannot be predicted in advance. Therefore, the observance of strict ordering rules by the program itself can be impossible in such systems.

Because of the possibility of instruction reordering on-the-fly, if strict ordering of memory accesses must be maintained between multiple processors, explicit memory barrier instructions must typically be included within the instruction set of the processors. These instructions are used to avoid a situation where two or more processors are attempting to obtain write access to the same location in memory at the same time.

One such interlocking primitive is a reduced instruction set computing (RISC) style load-locked, modify, store-conditional sequence. The semantics of these instructions are such that the load-locked instruction first obtains a read only copy of the block. If no other agent has written to the block between the time of the load-locked and store-conditional, the store-conditional instruction is allowed to update the block. Otherwise, the store-conditional instruction fails. In either case, the store-conditional instruction returns a status flag indicating whether or not it succeeded. If the store-conditional instruction fails, the program must eventually branch back and retry the sequence. This style of interlocking primitive has been found to scale very well with the speed of a cache, and therefore is presently an attractive approach for implementing shared memory access in multiple processor systems.

In the past, these interlocking primitives have typically been implemented by using a lock register consisting of a lock valid flag and a lock address. Upon receiving a load-locked instruction, the lock valid flag is set and the lock address register is stored with an address indicating the range of locations corresponding to the locked block. Upon the receipt of a store-conditional instruction, the lock address register is checked. If the lock valid flag is still set, then the store-conditional instruction is allowed to succeed. Otherwise, the store-conditional instruction fails.

The lock valid flag may be controlled by using any number of techniques. For example, so-called invalidating probe command logic is commonly implemented in multiprocessor system hardware. If an invalidating probe command is available in the processors, it can be used to manipulate the lock valid flag. For example, each processor can simply include logic or a microprogram which clears the lock valid flag whenever an invalidating probe command issued by another agent matches the address stored in the corresponding lock register. This is typically done when another agent has stored data at the locked address during the pendency of a load-locked instruction.

Multiprocessor systems which use the load-locked store-conditional instruction primitive therefore typically need to maintain copies of lock registers and lock address registers for each memory block for which locking is desired.

SUMMARY OF THE INVENTION

The present invention removes the need for a specific lock address and lock flag status registers in each processor for each block of memory for which interlocking is desired.

In particular, the processors use a cache valid bit associated with each cache line as a type of lock flag. When the load-locked instruction is executed, data is obtained from the cache in the normal manner. For example, if there is a cache miss, then data is obtained from outside of the cache in a read-only transaction. The dirty bit is cleared and the valid bit is set.

When a processor then executes a store-conditional instruction, the instruction succeeds if the addressed location is present in the cache and the cache location can be made writeable. Otherwise the store-conditional instruction fails.

A cache location is considered to be un-writeable if a cache miss occurs on the write attempt.

The store-conditional instruction can successfully write to a cache location if the corresponding valid bit is still set and the dirty bit is also set. The dirty bit being set is taken as an indication that the processor has previously written to the location and therefore already has permission to access it.

If the cache location is not dirty, however, then the processor must first obtain permission to write to it. To do so, an invalidating probe command is first sent to other processors in the system to obtain permission to write to the block. If the invalidating probe command succeeds, the location is written and the store-conditional instruction succeeds. Otherwise, the store-conditional instruction must fail, given that the processor cannot obtain permission to write the location.

The above scenario should be augmented with additional functionality in order to prevent instructions other than the load-locked and store-conditional from inadvertently evicting the "locked" blocks.

One way of preventing eviction of locked blocks by a processor's own internal execution of other instructions is to consider instruction stream references and data cache references that might corrupt the contents of the cache. The possibility of out-of-order execution of other instructions should also be accounted for.

For example, if a processor sees an older load instruction after a load-locked instruction, but before a store-conditional instruction, then the load-locked instruction may be replayed to restore the intended contents of the cache. Similarly, after a load-locked instruction is seen, any newer store instructions are stalled from executing until the store-conditional corresponding to the load-locked is completed. And, once a store-conditional is seen, any further load or store instructions are stalled until the store-conditional instruction is complete.

It is also possible that instructions initiated by other processors or agents in the system may affect a locked block. This can be avoided by requiring all processors in the system to observe the principles of fairness and liveness. For example, any external agent which intends to update the contents of a stored block must observe the convention of always issuing an invalidating probe command to inform other processors of its intent to do so prior to actually writing the location. Furthermore, for any processor which may issue instructions speculatively, such as a result of branch instruction prediction, only non-speculative store-conditional instructions are permitted to fully complete operation.

The coherence of this scheme of using the valid bit as an indiction of lock status is therefore dependent upon the observation of the above logical axioms by each agent having access to the shared block.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 7 is a state diagram for instruction logic to determine when an external agent attempts to write to a locked block.

DETAILED DESCRIPTION OF THE PREFERRED EMBODIMENT

Figure 1:
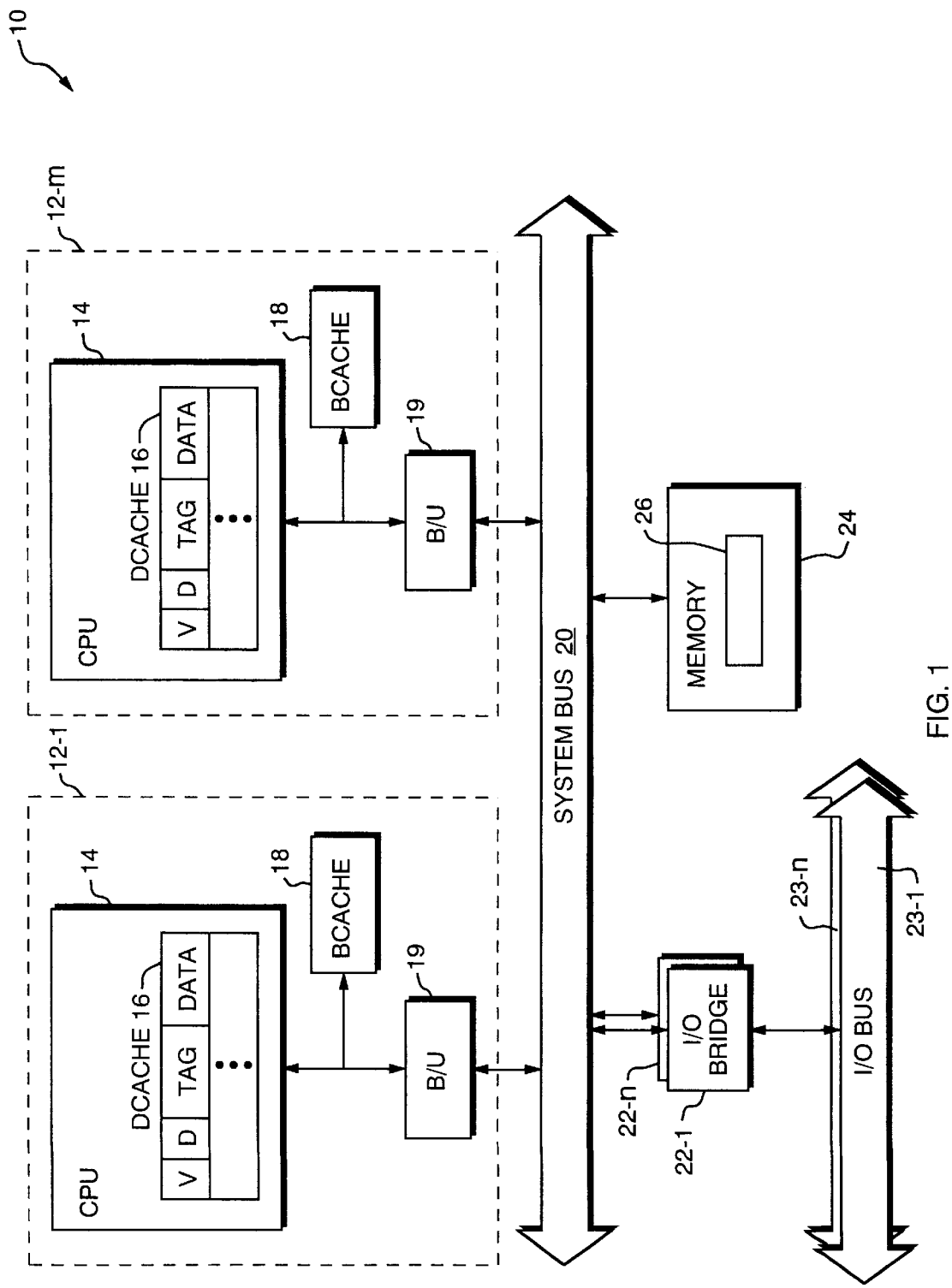
FIG. 1 is a block diagram of a multiprocessor system in which the dirty bit of a local cache is used to implement load-locked and store-conditional instruction logic.

Turning attention now to the drawings more particularly, FIG. 1 is a block diagram of a data processing system 10 including multiple processors 12-1, . . . , 12-m, connected by a system bus 20 to multiple input/output (I/O) bridges 22-1, . . . , 22-n, that each control a corresponding I/O bus 23-1, . . . , 23-n. A memory 24 is also connected to the system bus 20.

Each processor 12 includes a central processing unit (CPU) chip 14, a local or internal cache memory 16, an external ("off chip") cache 18, and bus interface unit (BIU) 19.

The system 10 may be implemented, for example, in accordance with the Alpha archiecture developed by Digital Equipment Corporation of Maynard, Mass. Within the context of the Alpha architecture, the internal cache memory 16 is typically referred to as the "Dcache" and the external cache is referred to as the "Bcache". The caches 16 and 18 include elements typical of cache memories, for example, for each location in the caches 16 and 18 there is associated a valid bit (V), a dirty bit (D), a tag field (TAG), and a data field (DATA).

The present invention is a technique for implementing certain instructions that permit a location, or more typically, a block of locations 26, in the memory 24 to be shared among multiple "agents". An agent may include any of the processors 12-1, . . . , 12-m, (I/O) or any other devices connecting to the system bus 20 via the bridges 22-1, . . . , 22-n, which observe the axioms described herein.

The present invention is concerned with a manner of implementing read and write instructions that operate on the shared block 26 in order to avoid write conflicts. In an environment such as the multiprocessor system 10, it is advantageous to be able to use multiple caches 16, 18 within each processor 12 as well as other techniques such as bypassed write buffers, write merging, instruction pipelines and so on, to maximize instruction execution speed. However, such architectures require that memory accesses sometimes occur in an order in which is different than the order in which the program instructions were originally specified. To avoid corruption of the memory block 26 in this environment, therefore, explicit memory barrier instructions are required in particular instances to ensure that no processor 12 or other agent writes to the shared memory block 26 improperly.

It has been known for some time within the context of reduced instruction set (RISC) type processors 12 that so-called load-locked (LDxL) and store-conditional (STxC) instructions may be used to perform such an atomic update of a shared location 26. (The "x" in the above instructions indicates the length of the location accessed. For example, within the Alpha instruction set, an LDQL instruction loads a locked "quadword", and STLC loads a "long word" conditionally.)

The LDxL and STxC instruction pairs may typically be used to implement a semaphore using a single shared memory location 26 to control access to large blocks of shared memory. For example, the memory location 26 may indicate which of the processors 12 currently has access to a particular data structure. It is critical therefore, that the memory location 26 be updated with the appropriate processor index only at the appropriate time and only by a processor which is authorized to access the location 26.

In traditional computing system architectures, LDxL and STxC instructions have been implemented by setting and clearing status bits or lock flags to ensure that the instructions are issued in order, and by having an explicit lock register that holds the address of the locked memory block 26. When a load-locked instruction is executed, the processor 12 records a target physical address in the lock address register and sets the lock flag. If the lock flag is still set when the store-conditional instruction is executed, then the store operation occurs, otherwise it fails. In this manner, each processor 14 having a lock flag and lock register can be granted access to the memory block 26.

Each processor 12 also has an inter-processor communication mechanism, implemented such as by the hardware in the bus interface units 19. This inter-processor communication mechanism permits a first processor 12-1 to communicate concerning the status of its lock flags. For example, if a first processor 12-1 has its lock flag set and the second processor 12-m successfully performs a store within a range of locked physical addresses 26, then the lock flag in the first processor 12-1 is cleared.

However, this prior technique requires that a lock register and lock flag be implemented at each processor 12 for each block 26 needing to be locked.

In contrast to this, the present invention avoids the requirement to have explicit lock registers by instead using the valid bit V within the cache 16 to indicate which blocks 26 are locked. The invention therefore also provides performance improvements in that the processors 12 do not need to cooperate to maintain the status of lock registers and lock flags for multiple blocks 26.

Additional measures must therefore be taken beyond simply setting the valid bit V within the cache 16. To better understand how the valid bit can be used to supplant the use of individual lock registers and lock flags, turn attention now to FIG. 2, where the architecture of an exemplary CPU 14 is discussed in greater detail.

The CPU 14 includes, among other items, an instruction cache 40, an instruction pipeline or issue queue 42, instruction selector 44, order encoder 46, instruction control logic 48, execution units 45-0, 45-1, 45-2, and 45-3 (collectively, execution units 45), and a number of status flags, including a store wait flag (ST_WAIT) 47-1, store conditional success flag (StxC_SUCCESS) 47-2, predict inhibit flag (PRED_INHIBIT) 47-3, branch fall through flag (BR_FALL_THRU) 47-4, and invalidate probe flag (INV_PROBE) 47-5.

Figure 2:
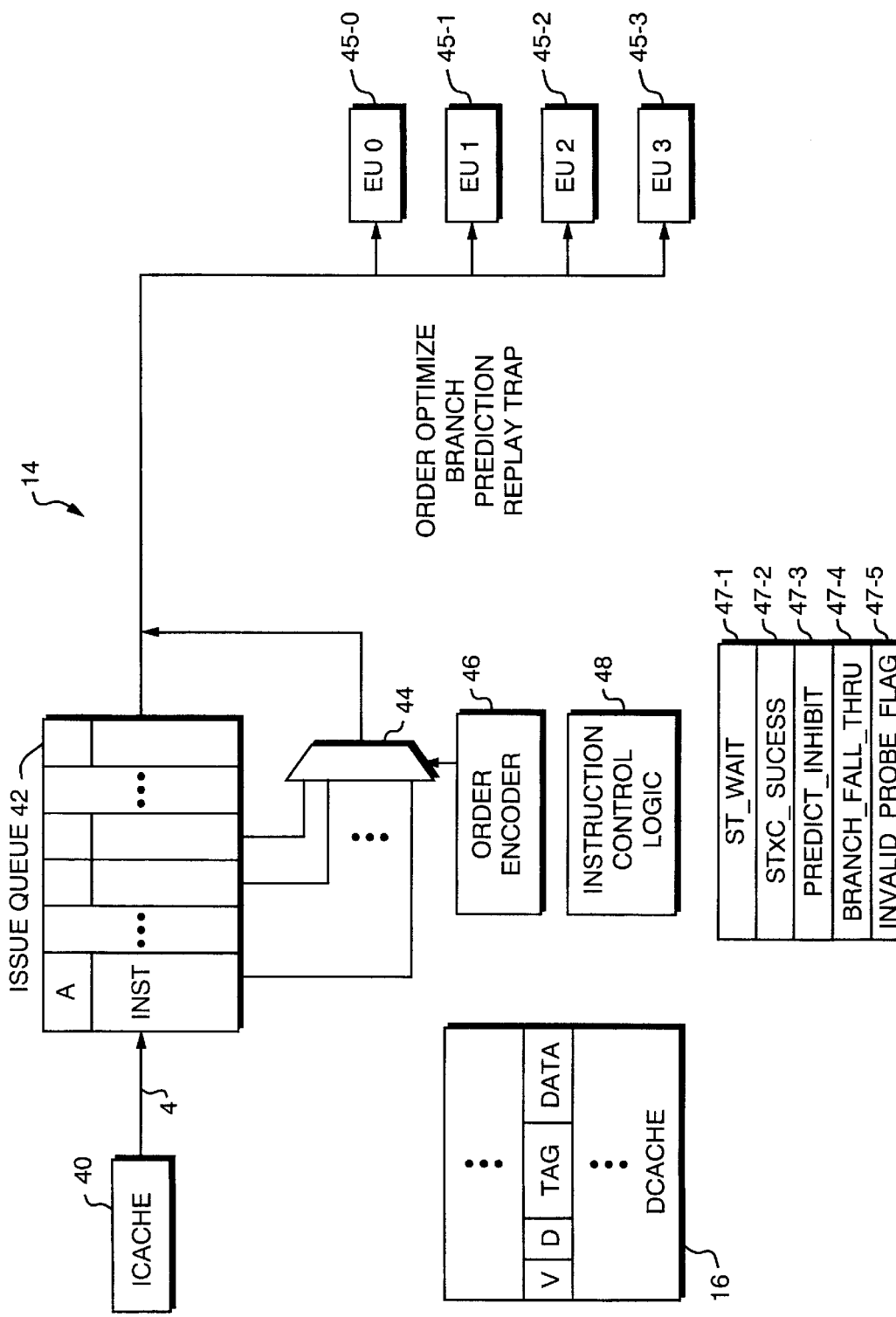
FIG. 2 is a more detailed block diagram of one particular implementation of such a processor which may execute instructions out of order.

Although no explicit connections are shown in FIG. 2 between the various elements, such as between the internal cache 16, the instruction cache 40, the execution units 45, the order encoder 46, and instruction control logic 48, it should be understood that appropriate logic signal and control bus connections permit the reading and writing of data from the cache 16 and instruction cache 40 as required by the execution units 45 to complete the execution of instructions in a known manner.

As previously mentioned, the CPU 14 is an out of order type execution processor in which instructions are not necessarily executed in the same order in which they are originally specified by the programmer. Rather, instructions are typically handled as follows. First, after fetching an instruction from memory, it is placed in the instruction cache 40, such as in an order specified by a program counter (not shown). Instructions are then clocked from the instruction cache 40 into the issue queue 42. The issue queue 42 maintains the operation code, operands, and other bits of each instruction along with a age data field (A) indicating how long it has been since the instruction was read from the instruction cache 40.

The issue queue 42 may thus make use of the selector 44 and order encoder 46 to reorder the actual sequence of execution of any number of instructions. In addition, the issue queue 42 typically also implement replay trap logic which permits the reissuance of any one of the previous N instructions.

While the issue queue 42 normally operates on a first-in, first-out basis, the selector 44 and order encoder 46 may be used to select certain instructions from the issue queue 42 to be executed out-of-order. In accordance with known techniques, any number of events may dictate that it is more efficient for the CPU 14 to execute certain instructions out of order, and these are not particularly pertinent to the present invention. It is sufficient here to say that this may depend upon a number of factors such as the present state of the internal cache 16 or external cache 18, the length of prior instructions in the queue 42, the specific instructions pending, or other factors.

In addition it should be understood that instructions may issue on a speculative basis before the results of a particular branch instruction are known, with instructions in both possible paths of the branch being executed on a conditional basis until the results are actually known.

The CPU 14 may also typically use multiple execution nits 45 whereby more than one instruction may be executing at a given time.

As previously mentioned, one type of read/write instruction primitive of interest includes the load-locked (LDxL) and store-conditional (STxC) interlock instructions. These instructions are implemented by using the existing valid bit V in the cache 16 for information concerning exclusive ownership. Using the valid bit V in this manner eliminates the need for explicit lock registers and also increases the performance of load-locked and store-conditional processing.

Figure 3:
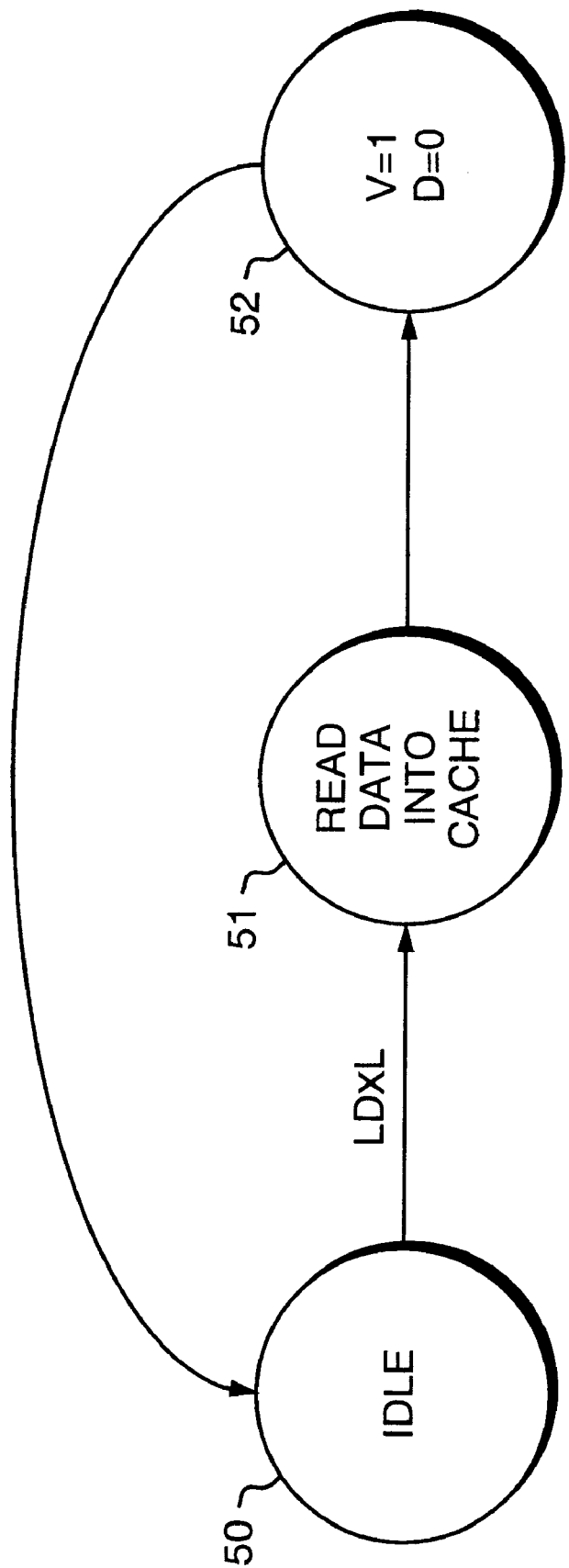
FIG. 3 is a detailed state diagram for instruction logic which implements a load-locked instruction.
Figure 4:
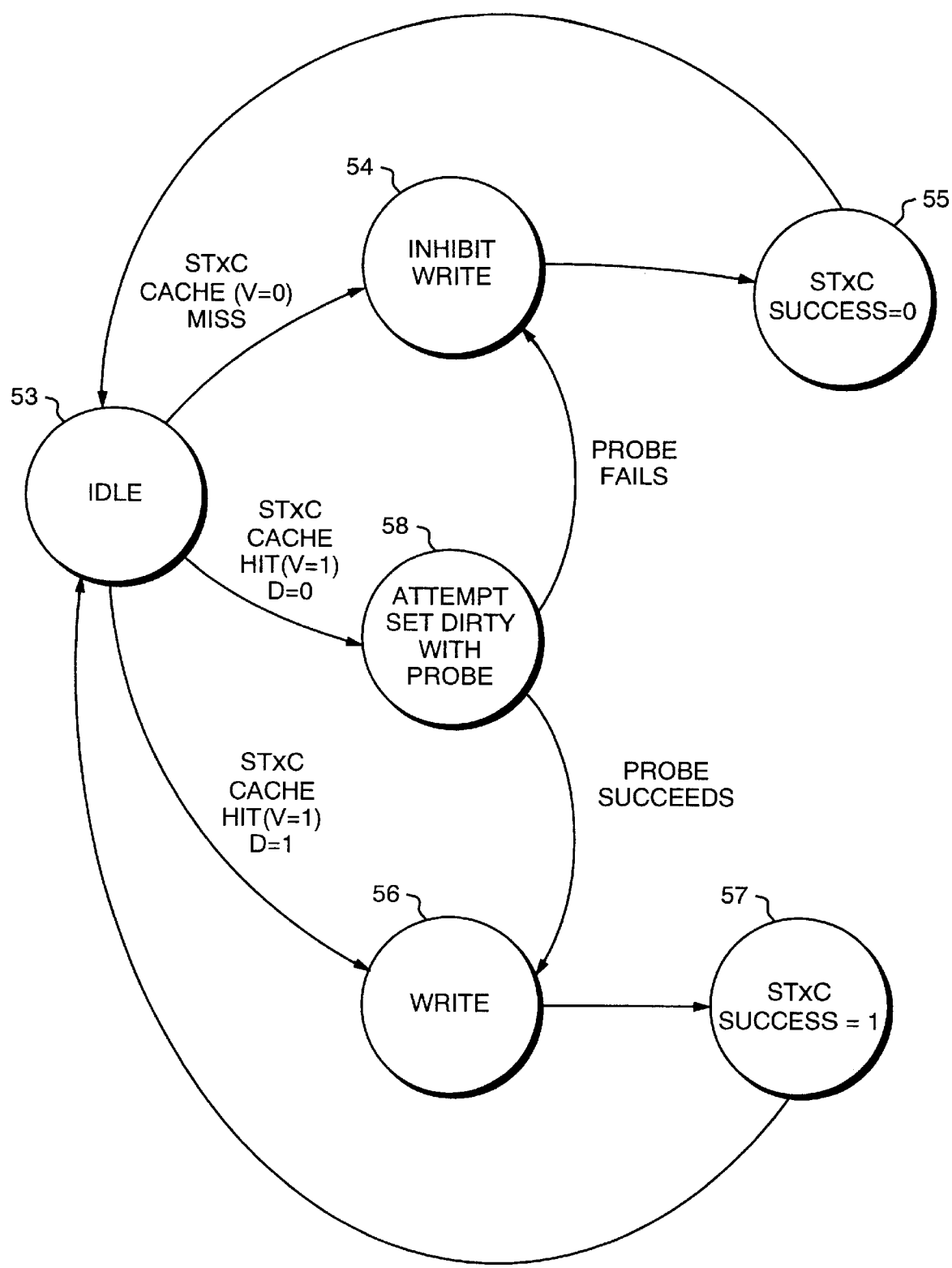
FIG. 4 is a state diagram for instruction logic to implement a store-conditional instruction.

The semantics of the preferred manner of implementing the LDxL and STxC instructions are shown in FIGS. 3 and 4, which are state diagrams of the processes followed by the instruction control logic 48. Referring first to FIG. 3, the instruction control logic 48 begins in an idle state 50. From that idle state 50, upon receipt of an LDxL instruction, the logic 48 proceeds to a state 51 where a read only copy of the addressed block 26 is obtained from the main memory 24 (or backup cache 18) and placed in the local cache 16.

The logic 48 next proceeds to a state 52, where the corresponding valid bit is set and the dirty bit is cleared. This may be handled by the cache 16 itself, as the setting of the valid bit V and clearing of the dirty bit D is typically performed in a normal operation of first writing new data into the cache 16 such as from the main memory 24.

An StxC instruction is permitted to successfully write the contents of the local cache 16 only if the address location in the cache can be made writable. For instance, turning attention now to FIG. 4, once an STxC instruction is encountered, if it misses in the cache 16, (i.e. the valid bit is clear) a state is entered 54 in which writing of the data to the cache 16 is inhibited. The value of the STxC_SUCCESS flag 47-2 is then set to false at state 55, and processing returns to an idle state 53.

If, however, there is cache hit,(i.e. the valid bit is set) and the associated dirty bit is set true, the processor 14 may assume that it can write the location in state 56. The value of the STxC_SUCCESS flag 47-2 is then set to true in state 57.

Alternatively, if there is a cache hit, but the dirty bit is cleared, then the processor 12 may first attempt to set the dirty bit by sending an invalidating probe message in state 58. If the probe message succeeds, then processing may continue to state 56, where the location is written. If, however, the probe fails, then state 54 is entered where the writing is inhibited and the STxC instruction fails.

Because instructions other than LDxL and STxC may modify the contents of the cache 16, this scheme remains coherent only if a number of other axioms are observed by all of the processors 12 in the system 10. It is therefore also the responsibility of the control logic 48 to ensure that these axioms are observed by each of the processors 12.

The axioms include:

Axiom One. LDxL instructions are processed in order with their corresponding STxC instructions.

Axiom Two. Once a block has been locked by way of an LDxL instruction, a processor may not evict the block from its cache as a side effect of processing other instructions.

Axiom Three. An external processor which intends to update the contents of a locked block must use an invalidating probe command to inform other processors.

Axiom Four. Processors only generate external commands for non-speculative STxC instructions.

Both the system 10 and the CPUs 14 themselves cooperate to implement these axioms, which will now be discussed in greater detail.

The four axioms address different circumstances under which a "locked" block might be accidentally overwritten. Because the system 10 does not maintain information concerning which address was specified for a lock instruction, in general it is assumed that any other store instructions may for example, cause the contents of the local cache 16 to eventually be overwritten in an uncontrolled manner, thereby corrupting the contents of the shared memory block 26. Therefore, it is the purpose of the axioms to avoid circumstances in which any "locked" blocks 26 may be accidentally overwritten.

Axiom One. In-order Processing of LDxL/STxC Pairs

Figure 5:
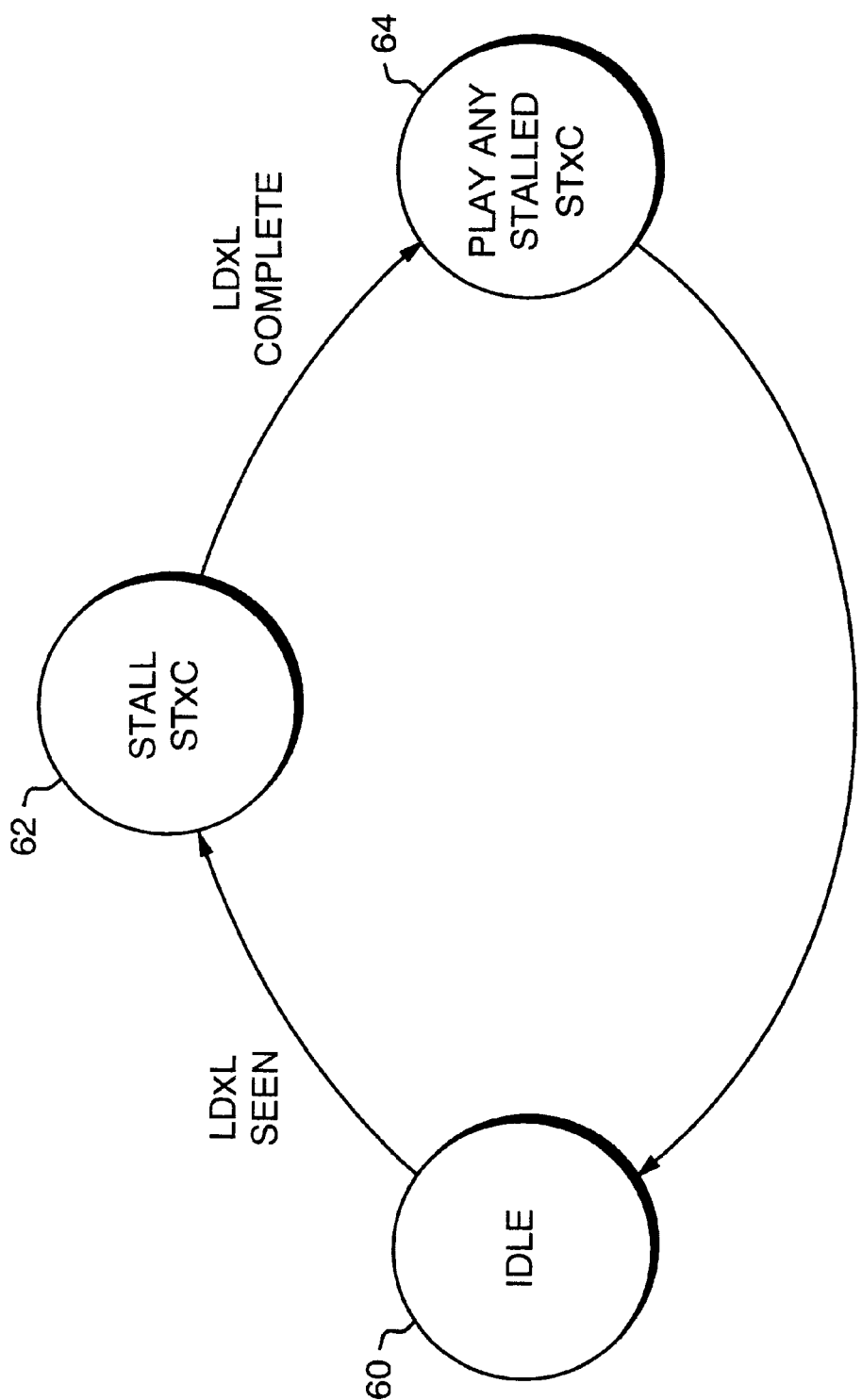
FIG. 5 is a detailed state diagram for instruction logic to ensure correct ordering of load-locked and store-conditional instruction pairs.

FIG. 5 shows a state diagram for a series of operations performed by the control logic 48 to implement Axiom One. From an initial idle state 60, when a load-locked instruction LDxL is first seen, such as when it is first placed in the issue queue 42, process flow proceeds to a next state 62. In this state 62, the control logic 48 issues signals to command the order encoder 46 to take steps to ensure that any store-conditional STxC instructions remain delayed or "stalled" in the issue queue 42. Only upon completion of an LDxL instruction, such as after it is completed by one of the execution units 50, is a state 64 entered in which any stalled STxC instructions are permitted to proceed through the issue queue 42 and be executed.

Axiom Two. Prevent Internal Corruption of Locked Blocks

Figure 6:
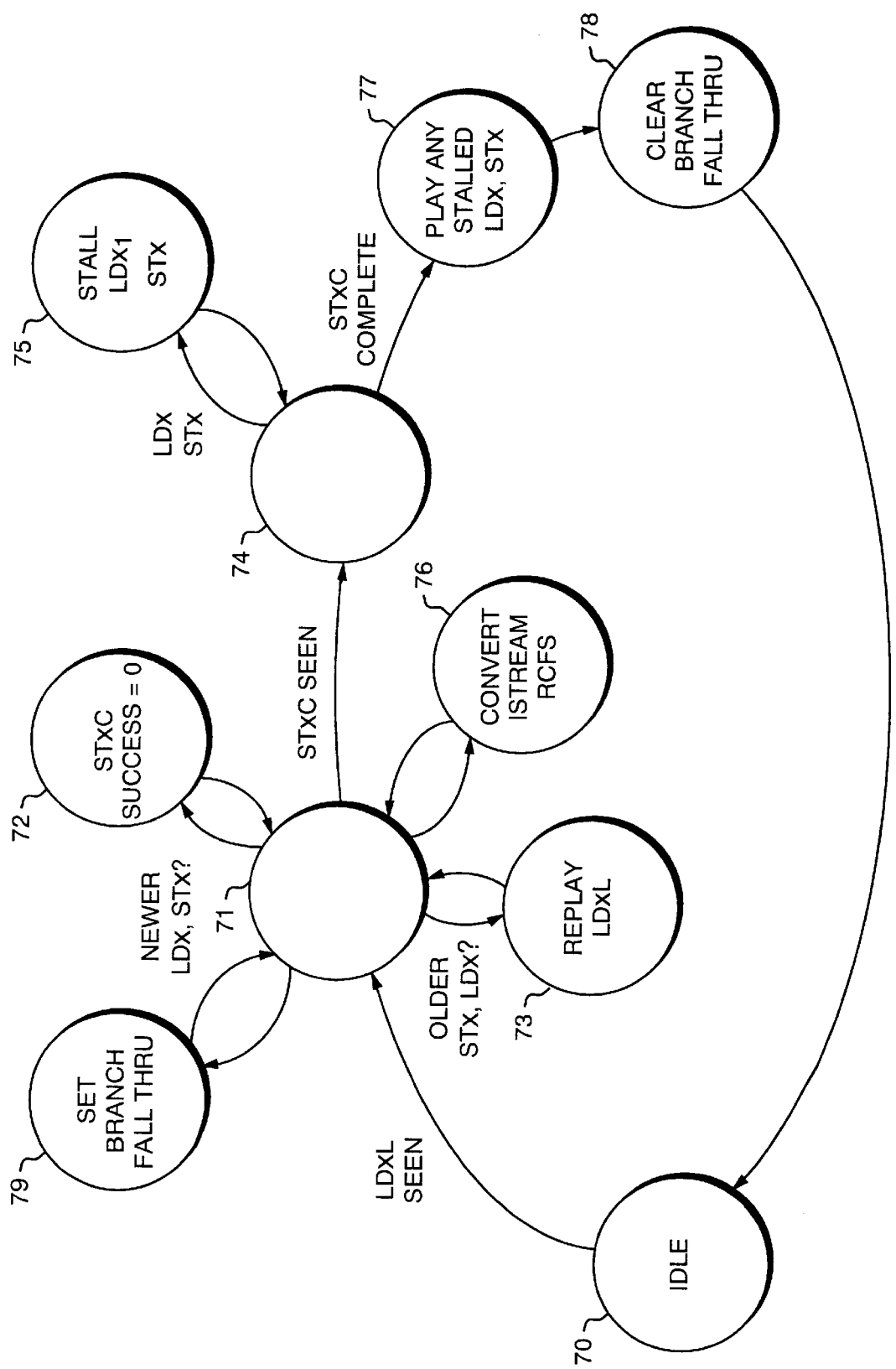
FIG. 6 is a state diagram for instruction logic to prevent corruption of locked blocks by the internal operator of a single processor.

FIG. 6 illustrates a series of states entered into by the control logic 48 to ensure that "locked" blocks are not internally corrupted, such as by execution of other instructions by the same processor 12 which issued the LDxL instruction in the first instance.

From an initial idle state 70, when an LDxL instruction is first seen, there is a state transition to a state 71. An LDxL is typically first seen when it is read from the instruction cache 40 and read into the issue queue 42. However, this event may occur at any time prior to the exit of the LDxL instructions from the issue queue 42 and operation by one of the execution units 50 upon it.

In state 71, a number of events are monitored in order to prevent an internal eviction of a locked block.

In a first scenario, a simple load (LDx) or store (STx) instruction may make reference to a cache 16 location. Unfortunately, because the normal operation of the cache 16 is such that its contents may be evicted at any time to be replaced by "fresher" data, it is possible that any type of LDx or STx instruction might displace the contents of a cache location that should actually be maintained in the "locked" state. Therefore, in order to prevent any newer STx or LDx instructions of any kind from corrupting the contents of the cache 16, any such newer LDx or STx instructions, that is having an age which is less than the LDxL instruction, cause a transition to state 72.

In this state 72, the STxC_SUCCESS flag 47-2 is set to zero to indicate that the result is unpredictable, and processing returns to state 71.

It should be understood that the out of order nature of the implementation of the processor 12 requires that this axiom be implemented in the control logic 48 rather than in software. For example, consider a programmed sequence of instructions as follows:

| LDx | R2, 4700 |
| LDxL | R1, 100 |
| processing | ... |
| STxC | R1, 100 | where the intended lock block 26 address is 100. Unfortunately the issue queue 42 may reorder the actual sequence of operation of these instructions so that, for example, the older LDx instruction may actually execute after the LDxL instruction as follows:

| LDxL | 100 |
| LDx | 4700 |
| STxC | 100 |

The cache 16 only contains a finite number of storage locations, and it must remain available to be updated by any instruction which accesses the memory 24. Therefore, any given LDx or STx instruction may possibly change the contents of the cache 16. Any given Ldx or Stx instruction may therefore displace a "locked" location. In order to prevent this from happening, when an older LDx or STx is seen by the control logic 48 in state 71, a state 73 is entered wherein the LDxL instruction is replayed in the issue queue 42. Thus, the replay trap is invoked to reexecute the LdxL instruction.

In the third scenario, if a newer LDx or STx instruction is seen after the LDxL, steps are taken to ensure that any associated STxC is completed before the newer LDx or STx instruction is executed. This may be accomplished, for example by stalling all subsequent instructions in state 74. State 74 is entered after the STxC instruction is first seen. From state 74, if any LDx or STx instruction is seen, then a state 75 is entered where the instruction is stalled in the issue queue 42. Eventually, upon an indication that the STxC instruction has completed, then a state 77 is entered where any stalled LDx or STx instructions are allowed to execute.

Preferably, upon entering state 74 the issue queue 42 operates in a mode whereby no other instructions of any type are permitted to enter the issue queue 42 until the pending STxC finishes. In this manner, better control can be had over the operation of the processor 12. In particular, any new instructions that may conflict with an active STxC are prevented from doing so until the STxC completes.

A fourth scenario contemplates the possibility that internal instructions other than LDx or STx may possible affect the contents of the cache 16. For example, the processor 12 may issue instructions speculatively in advance of knowing the actual results of a conditional branch instruction. To control this process, upon reaching state 71, the set branch fall through BRANCH_FALL_THRU flag 47-4 is set. When this flag 47-4 is set, the branch predictor portion of the order encoder 46 predicts all branches to "fall through", that is, it predicts that the branch "not taken" path will be followed. This then prevents any mispredicted branch instructions from introducing LDx or STx instructions which might unnecessarily evict the locked block.

In other words, by disabling branch prediction upon seeing an LDxL in state 79, greater control is had over the content of the cache 16. State 78 clears the BRANCH_FALL_THRU flag 47-4 after the STxC instruction is completed, so that the branch prediction operation may return to normal.

Another situation occurs in the context of needing to maintain the internal cache 16 and external cache 18 (FIG. 1) a hierarchal "pyramid" or subset relationship. In this case, the external cache 18 typically has a subset of the locations in main memory 24, and likewise the internal cache 16 contains a subset of the external cache 18 contents. The manner of implementing the subset of locations for the internal cache 16 is typically by mapping a given internal cache 16 addresses to multiple locations in the external cache 18 having the same lower order address bit. For example, all external cache 18 addresses of the form xxx100 are stored in the same physical location in the internal cache 16; therefore, (especially for instruction references) it is possible that an internal cache block 16 could be evicted by an instruction reference to a completely different location.

Therefore, precautions are taken in step 76 such that any instruction stream references which match an external cache index of a block presently in the internal cache 16 are converted to noncache references during the pendency of a LDxL instruction.

Axiom Three. External Operations use Invalidating Probes

FIG. 7 is a state diagram for the portions of the instruction control logic 48 which ensure that any external agents do not corrupt a locked block in the internal cache 16. From an idle state 80, whenever an instruction modifies a memory location, such as an STx instruction, an invalidating probe message is also sent to the other processors in the system by entering state 81. Also from state 80, when an LDxL is seen, a state 82 is entered in which the addressed block is read into the internal cache 16 and the dirty bit is cleared. At the same time, the INVALID_PROBE flag 47-5 is also cleared. Upon receipt of an invalidating probe command from another processor 12-m, then the INVALID_PROBE flag 47-5 is set in state 83.

Returning to state 82, once a STxC instruction is seen, either state 84 or state 85 is entered into, depending, respectivaly, upon whether the INVALID_PROBE flag 47-5 is cleared or set. In the former case, the internal cache 16 is still intact and the block may be written to memory. The value of the STxC_SUCCEES flag 47-2 is then set to true. If, however, the processor 12 has received an invalidating probe command from another processor 12-m, then the block is not written and the value of the STxC_SUCCEES flag 47-2 is set to false.

Axiom Four. Liveness and Fairness

The properties of liveness and fairness ensure that multiprocessor systems 10 behave generally such that all processors 12 simultaneously have equal access to shared resources such as the memory block 26. Liveness is a property that ensures that all processors 12 are connected together and may send messages to one another. To ensure that these tasks are implemented properly, the processor 12 only generates external "off chip" commands for non-speculative STxC instructions. Given a success indication by the system 10, the processor 12 then faithfully updates its local cache 16.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method for implementing load-locked and store-conditional instruction primitives in a data processing system consisting of a plurality of processors, the method eliminating the need for specific lock address or lock flag status registers in each processor for each block of memory for which interlocking is desired, and the method comprising the steps of, in one of the processors:

upon receiving a load-locked instruction specifying a load-locked source address, obtaining the contents of a memory location corresponding to the load-locked source address, and writing the contents thereof to a corresponding location in a local cache memory associated with the processor, setting an associated valid bit and clearing an associated cache dirty bit;

upon receiving a store-conditional instruction specifying a data source and a store-conditional destination address, determining whether the contents of the specified store-conditional destination address are present in the local cache memory as indicated by the valid bit, and therefore a cache hit, or are not present in the cache, and therefore a cache miss; and if a cache miss occurs, not storing the contents of the data source in the local cache memory at a location corresponding to the store-conditional destination address the store-conditional instruction thereby failing;

if a cache hit occurs, and the associated dirty bit is set, storing the contents of the data source in the local cache memory at a location corresponding to the store-conditional destination address, the store-conditional instruction thereby succeeding; and if a cache hit occurs, and the associated dirty bit is cleared, obtaining permission from other processors in the system before storing the contents of the data source in the local cache memory and before permitting the store-conditional instruction to succeed.

2. A method as in claim 1 additionally comprising the step of:

upon receiving other instructions, preventing such other instructions from inadvertently evicting contents of the cache during the pendency of a load-locked and store-conditional instruction pair.

3. A method as in claim 1 wherein the processor includes an instruction queue which may execute instructions out-of-order as compared to an originally specified program order, additionally comprising the step of:

upon receiving an older load instruction after a receiving a load-locked instruction, but before receiving a store-conditional instruction, replaying the load-locked instruction to restore the intended contents of the cache.

4. A method as in claim 1 wherein the processor includes an instruction queue which may execute instructions out-of-order as compared to an originally specified program order, additionally comprising the step of:

after receiving a load-locked instruction, stalling any newer store instructions from executing until a store-conditional instruction is received.

5. A method as in claim 1 wherein the processor includes an instruction queue which may execute instruction out-of-order as compared to an originally specified program order, additionally comprising the step of:

after receiving a store-conditional instruction, stalling any newer load or store instructions until the store-conditional instruction is completely executed.

6. A method as in claim 1 additionally comprising the step of:

upon receiving other instructions which may result in writing the contents of the local cache, issuing an invalidating probe command to inform the other processors of its intent to do so prior to actually writing the location.

7. A method as in claim 1 additionally comprising the step of:

preventing any store-conditional instruction which was issued speculatively from executing.

8. An apparatus for implementing load-locked and store-conditional instruction primitives in a data processing system consisting of a plurality of processors, the apparatus eliminating the need for specific lock address or lock flag status registers in each processor for each block of memory for which interlocking is desired, the apparatus comprising, in one of the processors:

an instruction issuer, connected to provide instructions to be executed by the processor;

a local cache memory comprising a number of addressable storage locations, the storage locations containing data fields and a cache dirty bit associated with each data field;

an external memory interface, connected to permit the processor to read and write locations in an external memory external to the processor, and an instruction controller, connected to the instruction issuer, the local cache memory, and the external memory interface, to receive a load-locked instruction specifying a load-locked source address, to obtain the contents of a location in the external memory corresponding to the load-locked source address, and to write the contents thereof to a location in the local cache memory, and to clear the associated cache dirty bit, and to receive a store-conditional instruction specifying a data source and a store-conditional destination address, and to determine whether the contents of the specified store-conditional destination address are present in the local cache memory, and therefore a cache hit, or are not present in the cache, and therefore a cache miss;

to prevent storing the contents of the data source in the local cache memory at a location corresponding to the store-conditional destination address, if a cache miss occurs;

to store the contents of the data source in the local cache memory at a location corresponding to the store-conditional destination address if a cache hit occurs, and the associated dirty bit is set; and if a cache hit occurs, and the associated dirty bit is cleared, to obtain permission from other processors in the system before the contents of the data source in the local cache memory are stored.

9. An apparatus as in claim 8 wherein the instruction logic is additionally connected to, upon receiving other instructions, prevent such other instructions from inadvertently evicting contents of the cache during the pendency of a load-locked instruction.

10. An apparatus as in claim 8 wherein the processor additionally comprises:

an instruction queue, connected to receive instructions from the instruction issuer, and to execute instructions out-of-order as compared to an originally specified program order.

11. An apparatus as in claim 10 wherein the instruction logic is additionally connected to, upon receiving an older load instruction after a receiving a load-locked instruction, but before receiving a store-conditional instruction, cause the instruction queue to replay the load-locked instruction to restore the intended contents of the cache.

12. An apparatus as in claim 10 wherein the instruction logic is additionally connected to, after receiving a load-locked instruction, cause the instruction queue to stall any newer store instructions from executing until a store-conditional instruction is received.

13. An apparatus as in claim 10 wherein the instruction logic is additionally connected to, after receiving a store-conditional instruction, cause the instruction queue to stall any newer load or store instructions until the store-conditional instruction is completely executed.

14. An apparatus as in claim 8 wherein the instruction logic is additionally connected to, upon receiving other instructions which may result in writing the contents of the local cache, issue an invalidating probe command to inform the other processors of its intent to do so prior to actually writing the location in the local cache.

15. An apparatus as in claim 8 wherein the instruction logic is additionally connected to prevent any store-conditional instruction which was issued speculatively from executing.

* * * * *